Oct. 28, 1969  E. C. LUCKENBACH  3,475,326
TRANSFER LINE APPARATUS AND METHOD
Filed Sept. 13, 1967

E. C. Luckenbach INVENTOR

BY George M. Gould

PATENT ATTORNEY

United States Patent Office 3,475,326
Patented Oct. 28, 1969

3,475,326
TRANSFER LINE APPARATUS AND METHOD
Edward C. Luckenbach, Mountainside, N.J., assignor to Esso Research and Engineering Company, a corporation of Delaware
Filed Sept. 13, 1967, Ser. No. 667,497
Int. Cl. C10g 11/18; B01j 9/18
U.S. Cl. 208—153                                6 Claims

ABSTRACT OF THE DISCLOSURE

The present disclosure relates to regenerative fluid catalytic conversion systems utilizing a transfer line reactor to increase over-all conversion. The efficiency of such a system is substantially improved by introducing an essentially right-angle bend downstream of the feed injection point in the transfer line. Applicability of such systems is particularly directed to fluidized catalytic cracking of petroleum hydrocarbons.

DESCRIPTION OF THE PRIOR ART

Figure 1:
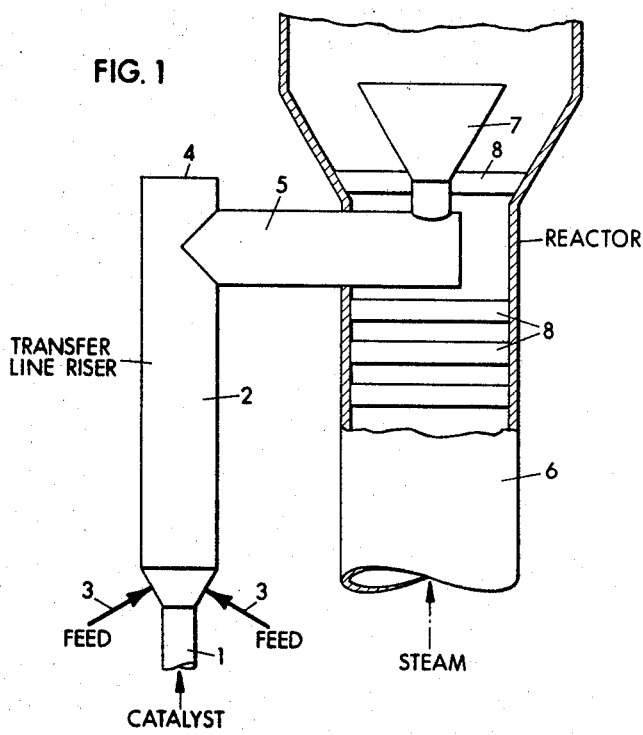

It has now become well established in the art to utilize moving catalyst beds in hydrocarbon conversion systems. An early example of such a system is disclosed in U.S. 2,433,798. This patent discloses mixing a powdered catalyst with a heated, vaporized oil feed so as to form a suspension of the catalyst in the feed. The oil-powdered catalyst mixture is then carried to upflow reactor where the velocity of the catalyst particles will be less than the rising oil vapors. The catalyst particles will "fall backward" with respect to the hydrocarbon feed vapors. However, the catalyst still will be moving in an upward direction with respect to the reactor itself. The result is an effective high catalyst to oil ratio within the reactor vessel. This keeps down the necessary charge ratio of catalyst to oil.

The catalyst product vapor mixture is fed to a cyclone separator where the catalyst is removed from the vapor stream. The catalyst is sent to a regeneration zone and subsequently returned to the feed section of the system.

Moving catalyst systems were improved by the utilization of a dense fluid bed of catalyst rather than utilizing a suspension of powdered catalyst in the hydrocarbon vapor stream. An example of such a fluid catalyst system is to be found in U.S. 2,959,537 with specific reference to a hydroforming process. In this process, catalyst is mixed with an aerating gas ind injected at high velocity into a dense fluid bed of catalyst in a reactor vessel. The catalyst bed is maintained in a fluidized state by injecting the fluidized gas at the bottom of the vessel. Feed is directed into this fluidized bed and is converted into product therein. Product is taken overhead as a vapor phase while catalyst is constantly removed from the fluid bed and circulated to a regeneration vessel. Regenerated catalyst is then returned to the fluid bed in the manner indicated at the beginning of the process.

Yet another technique is described in Re. 25,220. This patent describes the use of a transfer line reactor wherein a finely divided catalyst is mixed with the vaporized feed and passed through an elongated reaction zone at a gas velocity in the range from about 8 to about 50 ft./sec. The suspension contains an amount of catalyst so as to provide a space weight ratio of feed in lbs. per hour to catalyst holdup in lbs. of about 20 to 1 to about 3 to 1 and so a flowing weight ratio of catalyst to feed of about 4 to 1 to about 20 to 1 is provided. It is further contemplated that liquid recycle feed can be inserted prior to the transfer line reaction. The recycle will be vaporized; it will increase the effective conversion of the fresh feed for a given transfer line diameter and length. The catalyst suspension is then removed to a spent catalyst vessel where vapor products and liquid material move upwardly through the vessel and the catalyst particles move downwardly. A catalyst stripper section is provided where hydrocarbonaceous material is removed from the catalyst surface by the reaction of a steam stream moving upwardly against the downflowing catalyst particles. The catalyst particles are removed from the catalyst vessel and are regenerated in a regeneration zone and returned to the cycle.

A major problem presented by the processes in the art described above arises from excessive erosion observed in the transfer line system. Another major problem arises from the loss of homogeneity between the suspended catalyst and the feed vapors. In prior art systems, the gas-solid suspension separates and does not recombine to yield a homogeneous mix in the transfer line riser. The erosion problem and the separation of catalyst particles from the vapor problems are especially severe when the transfer line riser has long sweep bends downstream of the feed vapor injection point.

BRIEF SUMMARY OF THE INVENTION

The present invention overcomes the problems of erosion and catalyst particle separation from the suspension of catalyst in feed vapor previously found in the prior art. In particular, it has been found that the use of right angle sharp bends in the transfer line riser downstream of the feed injection point will unexpectedly yield a lower level of erosion in the riser vessel and will further result in a more homogeneous mixing of feed and catalyst than was obtainable by the prior art methods. Utilization of right angle sharp bends downstream from the feed injection point will result in further benefits including the following:

(1) Increases the straight sided transfer line initial contacting zone;
(2) Gives superior gas/solid mixing throughout the riser vessel;
(3) Gives superior gas/solids flow in the reactor vessel;
(4) Eliminates reactor grid plugging;
(5) Minimizes interference with gas-solids contactors in the stripping zone of the reactor and improves the recovery of hydrocarbons in the stripper;
(6) Lowers erosion in the riser vessel; and
(7) Eliminates the need for turning vanes in the feed riser.

It is believed that contacting in the feed riser of the present invention is improved due to the fact that the solids contained in the feed vapor stream will be stopped in the 90° bends. These solids will then be re-accelerated and remixed with the vapor phase after the bend in a turbulent mixing zone. This will lead to high slip velocities between the vapors and solids and result in excellent contacting.

The stopping of the solids in the essentially right angle sharp bend also will result in some build-up of catalyst solid materials at this point. This small build-up will act as a shield to prevent the erosion of the riser vessel wall at the bend point since the mixture of catalyst solids suspended in vapor will see only catalyst build-up at the right angle sharp bend. Thus, there will be only a catalyst to catalyst contact in the apparatus of the present invention rather than a catalyst to vessel wall contact as in the previous designs utilizing long sweep bends in the transfer line riser.

DESCRIPTION OF THE PREFERRED EMBODIMENTS

Figure 2:
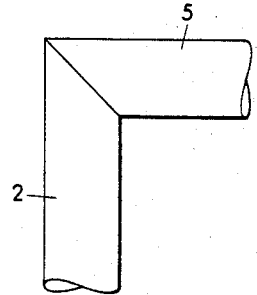
Figure 3:
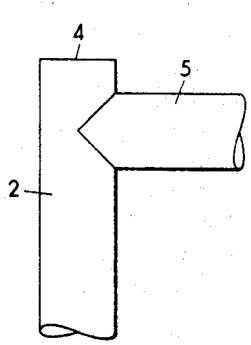
Figure 5:
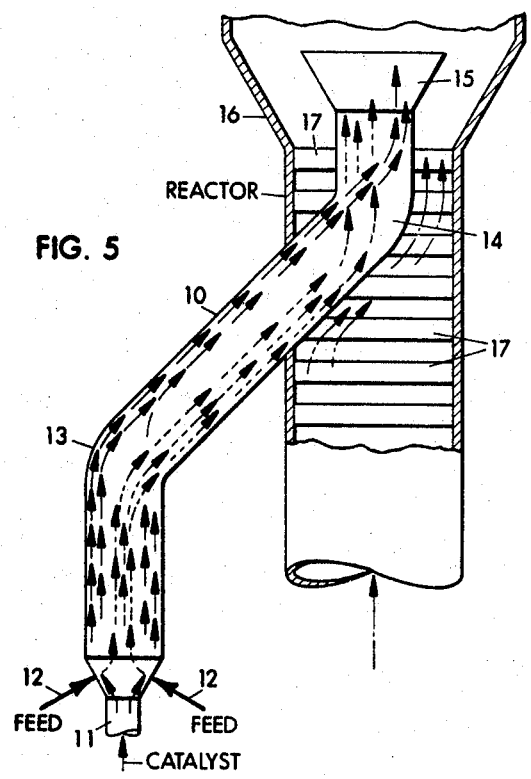
Figure 4:
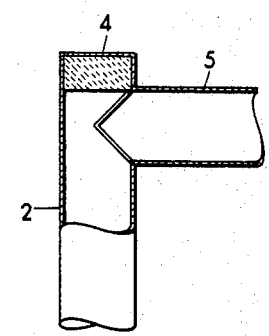

The present invention will become more clear by reference to the attached drawings. FIGURE 1 represents a schematic drawing of a transfer line feed riser utilizing a sharp right angle bend, the feed riser being associated with a catalyst reactor vessel of a fluid catalytic cracking system. FIGURES 2, 3 and 4 represent various sharp angle bend configurations in the feed riser. FIGURE 5 is a schematic representation of a conventional feed riser in a fluid catalytic cracking system utilizing long sweep bends in the transfer line. FIGURE 5 also describes the catalyst vapor suspension movement in the transfer line.

Turning first to FIGURE 1, which shows a transfer line riser of the present invention utilizing a sharp right angle bend downstream of the feed inlet. Regenerated catalyst from the regeneration zone of a conventional regenerative fluid catalytic cracking system (not shown) mixed with fresh catalyst enters transfer line riser 2 by means of inlet 1. This catalyst is mixed with liquid or partially and sometimes fully vaporized feed entering through feed inlets 3 and the mixture is passed upwardly through the transfer line vessel 2. For the purpose of demonstrating a specific embodiment of the present invention, the following reaction conditions will relate to transfer line catalytic cracking of petroleum feedstocks. It should be understood that it is within the capabilities of the present art to utilize the present invention for other processes in which case alternate conditions known to the art will be employed. Conditions in the transfer line for catalytic cracking include a temperature in the range from about 800 to 1150° F., preferably in the range from about 900 to 1030° F., a gas velocity in the range between about 6 to 75 ft./sec., preferably in the range from about 8 to 45 ft./sec., a pressure in the range from about 8 to 60 p.s.i.g., preferably in the range from about 15 to 45 p.s.i.g.; and a space velocity of hydrocarbon/hr. to catalyst hold-up in the transfer line in the range from about 10/1 to about 300/1, preferably in the range of about 20/1 to about 150/1, and a weight ratio of catalyst to oil in the range from about 4/1 to 20/1, preferably in the range of about 6/1 to 12/1.

The transfer line riser vessel 2 should have a length to diameter ratio in the range from about 2½:1 to about 100:1, preferably in the range from about 4:1 to about 10:1.

The feedstock which may be employed is preferably a gas-oil hydrocarbon such as one obtained from crude petroleum. However, other gas-oil fractions may be used. The heavy oil produced in the cracking operation or unconverted portions of the feedstock may form a component of the reaction feed. It is also contemplated that gas-oils produced from thermal cracking operations may suitably be charged to the apparatus of the present invention. It is contemplated that residual crude petroleum fractions may be charged as the feedstocks to this apparatus. The present invention may utilize as feed hydrocarbon the cracking stocks now used in either thermal or catalytic cracking of the hydrocarbons and thus may encompass a wide range of feedstocks. These feedstocks may be heated and partially vaporized by conventional means and introduced into transfer line riser 2 as indicated above where the feeds are then fully vaporized by the heat supplied by the catalyst.

The catalyst utilized herein may be any catalyst suitable for catalytic cracking operations. Such catalysts are now well known in the art. They include for example, synthetic alumina, mixtures of inorganic oxides, e.g. silica-alumina, and crystalline aluminosilicate zeolites, preferably encapsulated in a silica-alumina matrix.

The catalyst-hydrocarbon vapor suspension rises through the transfer line 2 until it comes in contact with the top of the transfer line vessel 4. At this point, the catalyst vapor suspension de-accelerates and a catalyst cushion is formed at the top portion of the transfer line riser. This unexpectedly causes a reduction in the erosive effect of the catalyst suspension on the walls of the transfer line vessel 2. The catalyst-hydrocarbon vapor suspension then re-accelerates in the direction horizontal to its original flow and moves outwardly from the transfer line riser into horizontal arm 5. There is turbulent flow in this area resulting in better mixing of the catalyst with the hydrocarbon vapors. This better mixing results in increased contact between the catalyst and the feed vapors thereby increasing the efficiency of the process.

In order to effectuate the desired de-acceleration of the catalyst-hydrocarbon vapor suspension in riser 2, it is necessary that horizontal arm 5 make at least a sharp 90° angle with riser 2. A somewhat larger angle may also be employed so as to result in a downwardly directed arm 5. Thus, an angle in the range from about 90 to 135°, preferably in the range from about 90 to 105° may be utilized between riser vessel 2 and horizontal arm 5. The connection of the vertical and horizontal portions of the feed riser should be so designed that there is no mitering in the connection, that is, two straight sections of piping are connected together along a plane which passes through the axes of each of the sections of the feed riser. This connecting plane is perpendicular to the plane which passes through the centerlines of each of the feed riser sections. An example of such a connection is shown in FIGURE 2.

The connections of the two sections may be made along two planes, each perpendicular to each other. This connection is essentially a T-type connection where one end of the top of the T may be plugged with either a cap such as shown in FIGURE 3 at 4 or formed refractory fill to effect a connection between two straight pipes as indicated in FIGURE 4. The basic ingredient of the connection is that no curved or mitered sections exist between the vertical and horizontal sections of the riser. If a T-type connections is used the refractory or metal blanked, end of the T can be terminated in a flat plane that is essentially horizontal or it can be formed so as to seem to be an extension of the top half of the horizontal line into the vertical line.

The well mixed catalyst-hydrocarbon vapor suspension is then brought into reactor vessel 6 by means of feed cone 7. Additional reaction between the catalyst and the feed takes place in this zone and catalyst is separated from the resulting products and unreacted feed in a conventional manner not shown. The reactor vessel 6 is provided with a series of stripper sheds 8 which separate downwardly flowing catalyst from any entrained hydrocarbon material thereon by means of an upwardly flowing streams of steam. It has been found that the use of a horizontal arm 5 in the riser section results in a design which minimizes the interference with flow through stripper sections 8. Used catalyst moves downwardly through a reactor vessel 6 and is returned to regeneration zone in a conventional manner (not shown).

Reference is now made to FIGURE 5 which is a flow diagram of a conventional transfer line riser. In this figure, it should be noted that the flow of catalyst particles is indicated by a solid arrow while the flow of hydrocarbon vapor is indicated by broken arrows.

In the conventional feed riser transfer line indicated by vessel 10, regenerated catalyst enters through line 11. The catalyst particles are mixed with feed liquid and vapor entering via inlets 12. The feed is immediately vaporized. The feed riser utilizes two approximately 45° long angle bends at 13 and 14. These bends may be multisection mitered sections or bent sections of pipe. The total angle of each of the bends (that is, the change in direction in the feed riser between vertical and sloped sections) may be as small as 15° or as much as 60°.

The flow pattern for the catalyst particles suspended in feed vapor for such a transfer line configuration indicates that the catalyst does not mix into the vapor phase. Rather the resulting flow indicates that there is a substantially complete segregation of catalyst into a streamer on the top of the line (indicated by the group of solid arrows at the top of vessel 10). On the other hand, the vapor hydrocarbon phase moves as a separate stream on the lower side of the feed riser. The streams cross with a minimum of turbulence near bend 14 and the catalyst flows to the other side of the reactor vessel in the form of a dense stream.

It is evident that there will be less efficient cracking in the transfer line 10 than in the previously described apparatus of the present invention. This is due to the inefficient contacting between the catalyst particles and the hydrocarbon vapor phase.

The essentially unmixed phases of catalyst and hydrocarbon vapor pass through feed cone 15 as before and enter into reactor vessel 16 of a conventional fluid catalytic cracking system. Use of long angle bends in riser 10 will result in interference with the operation of stripper sheds 17. It can be seen that the vapors rising up the stripper will be forced to the side of the stripper opposite the entry location of the feed riser. Thus poor stripping will occur in the zone and in the portion of the stripper above the feed inlet line. Thus, the use of the apparatus of the present invention results in still a further benefit due to its minimal interference with the action of the stripper sheds in the reactor vessel.

What is claimed is:

1. A fluid catalytic cracking system comprising an elongated, substantially vertical transfer line riser cracking reactor; said reactor having fluid feed inlet means, solid catalyst inlet means and fluid catalyst mixture outlet means; a fluid bed cracking reactor vessel adjacent said cracking reactor and a conduit connecting the outlet means of the cracking reactor with an interior portion of said reactor vessel, said conduit being so constructed and arranged as to form a sharp angle bend of at least 90° with respect to the vertical axis of the transfer line riser cracking reactor.

2. The cracking system of claim 1 wherein the fluid catalyst mixture outlet means of the conduit communicates with the feed cone of the cracking reactor vessel.

3. The improved reactor of claim 1 wherein said sharp angle bend is in the range from about 90 to 135°.

4. The improved reactor of claim 1 wherein the said elongated feed riser vessel has a length to diameter ratio in the range from about 2½:1 to about 100:1.

5. An improved process for catalytically cracking a hydrocarbon feed consisting essentially of the steps of:
 (a) mixing a solid cracking catalyst with vapors of said feed to form a suspension of the catalyst in the vapors;
 (b) passing said suspension upwardly through an elongated, vertical transfer line cracking reactor at hydrocarbon cracking conditions;
 (c) deaccelerating said suspension in the upper portion of said reactor; and
 (d) reaccelerating said suspension in an essentially horizontal direction into a fluid bed cracking reactor vessel for further cracking of the vapors whereby a homogeneous mixture of feed catalyst is maintained throughout the process.

6. The process of claim 5 wherein said hydrocarbon is a petroleum based fluid catalytic cracking feedstock and the conditions in said elongated vessel are fluid catalytic cracking conditions comprising a temperature in the range from about 800 to 1150° F., a gas velocity in the range between about 6 to 75 ft./sec., a pressure in the range from about 8 to 60 p.s.i.g., a space velocity of hydrocarbon/hr. to catalyst hold-up in the vessel in the range of about 10/1 to about 300/1 and a weight ratio of catalyst to oil in the range from about 4/1 to 20/1.

References Cited

UNITED STATES PATENTS

| 2,344,900 | 3/1944 | Reeves et al. | 208—153 |
| 2,428,873 | 10/1947 | Gunness et al. | 208—164 |
| 2,799,095 | 7/1957 | May et al. | 208—153 |
| 3,050,572 | 8/1962 | Masterton et al. | 208—153 |
| 3,123,547 | 3/1964 | Palmer et al. | 208—153 |
| 3,188,184 | 6/1965 | Rice et al. | 208—164 |

HERBERT LEVINE, Primary Examiner

U.S. Cl. X.R.
23—288; 208—164